United States Patent [19]
Bolash et al.

[11] Patent Number: 5,970,221
[45] Date of Patent: Oct. 19, 1999

[54] PRINTER WITH REDUCED MEMORY

[75] Inventors: John Philip Bolash; Thomas Jon Eade, both of Lexington, Ky.

[73] Assignee: Lexmark International, Inc., Lexington, Ky.

[21] Appl. No.: 08/942,657

[22] Filed: Oct. 2, 1997

[51] Int. Cl.⁶ .................................................... G06K 15/00
[52] U.S. Cl. ............................................ 395/115; 395/113
[58] Field of Search ................................... 395/114, 115, 395/117, 112, 101, 116, 113, 828, 829, 834, 876, 877, 888; 358/404, 444, 426, 261.1, 261.3, 261.4, 432, 433; 382/180, 232

[56] References Cited

U.S. PATENT DOCUMENTS

| | | | |
|---|---|---|---|
| 4,901,248 | 2/1990 | Ueno et al. | 364/519 |
| 5,108,207 | 4/1992 | Isobe et al. | 400/70 |
| 5,150,454 | 9/1992 | Wood et al. | 395/114 |
| 5,471,322 | 11/1995 | Murata | 358/502 |
| 5,479,587 | 12/1995 | Campbell et al. | 395/116 |
| 5,483,622 | 1/1996 | Zimmerman et al. | 395/114 |
| 5,487,138 | 1/1996 | Rust et al. | 395/115 |
| 5,504,842 | 4/1996 | Gentile | 395/114 |
| 5,504,844 | 4/1996 | Ueda | 395/115 |

*Primary Examiner*—Arthur G. Evans
*Attorney, Agent, or Firm*—Ronald K. Aust

[57] ABSTRACT

A printer system and method with reduced memory. A first memory, a second memory, a third memory, and a device which converts image description data to bitmap data, compresses the bitmap data, prints the compressed bitmap data and controls the printing system. The system and method senses when the end of a swath of image description data is stored in the first memory or when the first memory is full, causing a conversion of the image description data to bitmap data. The bitmap data is stored in the second memory. The bitmap data in the second memory is compressed, and the compressed bitmap data is stored in the third memory. When the third memory means is full, the compressed bitmap data is printed. The memory capacity of each of the first, second, and third memories is variable, while the overall cumulative capacity of the first, second and third memories is held constant.

6 Claims, 3 Drawing Sheets

PRINTER WITH REDUCED MEMORY

BACKGROUND OF THE INVENTION

1. Field of the Invention

The present invention relates to printers, and more particularly, to a serial line printer with memory capacity significantly less than that required to hold one print line, or swath, of bitmap data.

2. Description of the Prior Art

Competition in the printer marketplace is such that printer manufacturers, such as Lexmark International, Inc., place great emphasis on cost minimization without sacrifice to function or performance. Random access memory (RAM) represents a system bottleneck and its cost relates directly to the height of the print line. For example, ink jet printers that process data in single print element rows (rasters) require memory in excess of one print line to perform the necessary conversion from the high level language (HLL) to the raw data format required by the print head.

In addition, presently, printers are essentially made up of discrete components, including a microprocessor, an application specific integrated circuit (ASIC), read only memory (ROM), and random access memory (RAM). A next generation of printers, currently under development, have imbedded in one chip the microprocessor, ROM and ASIC. A natural progression would lead to the inclusion of the RAM in the chip as well.

Therefore, there is a significant need in the art for a printer system and method with reduced memory requirements.

SUMMARY OF THE INVENTION

The present invention provides the compatibility of a high level language printer with a memory capacity which is less than the number of bits in one print swath. The print swath size is defined as the length of the print line (in inches) times the maximum resolution (in dots per inch) times the number of vertical pixels produced by the print head in a single pass (in pixels).

The printer memory is partitioned into at least three buffers. The first buffer is the High Level Language (HLL) buffer and is set up as the holding area for incoming image description data. The second buffer is the bitmap buffer and is used to store the bitmap data. The bitmap data is converted or interpreted HLL data. The third buffer is the compressed data buffer. This area is used to store compressed bitmap data before it is sent to the print engine. The size of each of these buffers is dynamic and is based on the size of the incoming HLL data. The starting and ending addresses defining the boundaries of the buffers are initialized to starting values but can be modified by the printer controller to improve efficiency and increase memory utilization.

After the initial buffer limits have been set, the printer begins to receive HLL data from the host. The HLL data is stored in the HLL buffer. Once a swath or a page has been received, the controller stops the receipt of data from the host. If the HLL buffer is not full, the ending address of the HLL buffer and the starting address of the bitmap buffer are modified by the controller so that any remaining memory in the HLL buffer is utilized for the bitmap buffer. The converting means then begins interpreting or converting HLL data into bitmap data. The bitmap data is stored in the bitmap buffer. Once the bitmap buffer is full or all rasters for the swath have been converted, a data compressor compresses the bitmap data in the bitmap buffer and stores it in the compressed bitmap buffer. As data is converted, the controller may overwrite bitmap data in the bitmap buffer, therefore increasing the size of the compressed bitmap buffer. Once the compressed bitmap buffer is full, the controller sends the compressed bitmap data to the print engine to be printed.

Other features and advantages of the invention may be determined from the drawings and detailed description of the invention that follows.

DETAILED DESCRIPTION OF THE INVENTION

Figure 1:
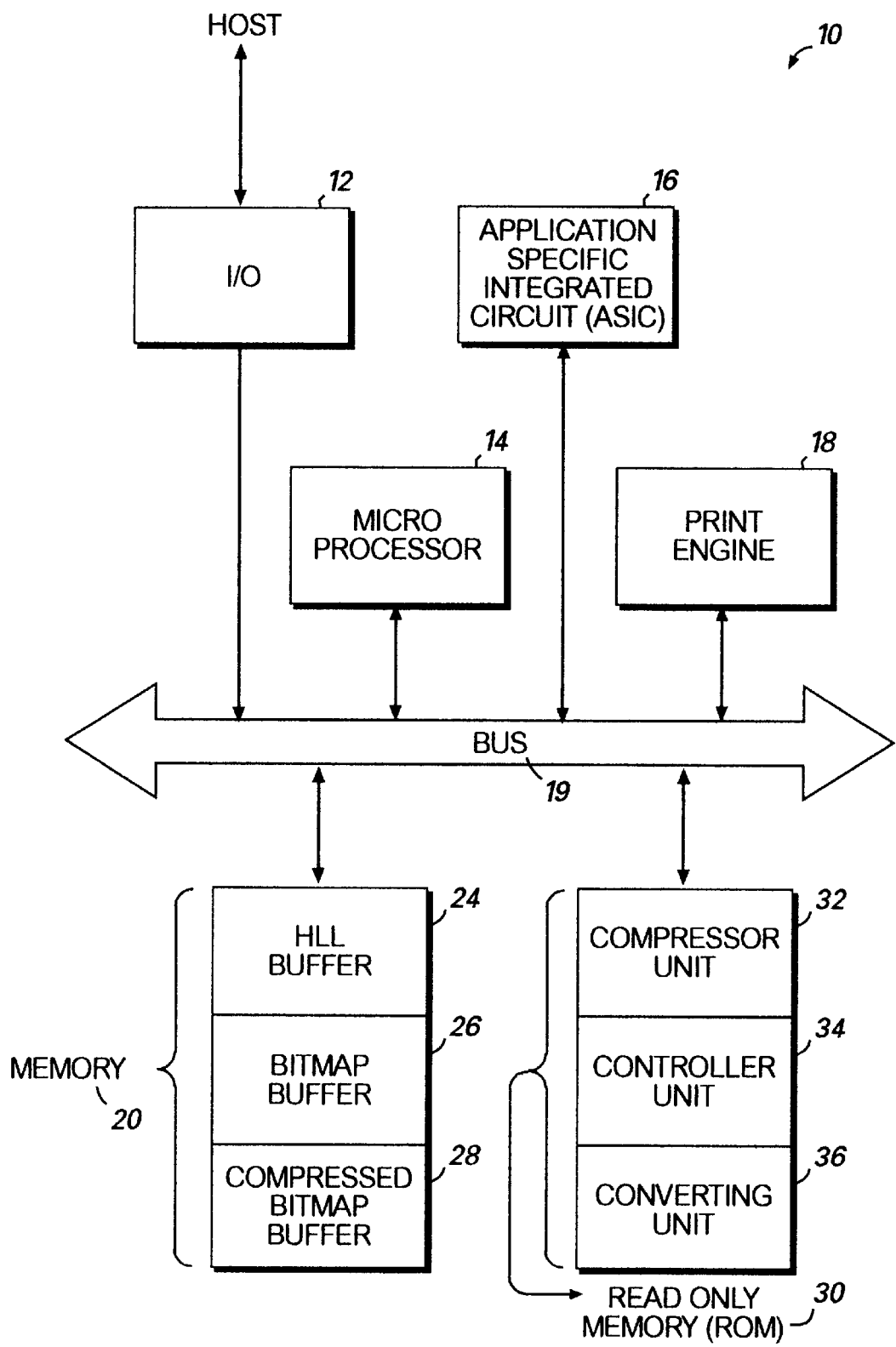
FIG. 1 is a block diagram of the printer that is adapted to carry out the invention.

A preferred embodiment of the invention is now described in detail. Referring to the drawings, like numbers indicate like components and/or steps throughout the views.

1. Definitions

A swath is the maximum number of pixels produced by the print head in a single pass.

The print swath size is defined as the length of the print line (in inches) times the maximum resolution (in dots per inch) times the number of vertical pixels produced by the print head in a single pass (in pixels).

A raster is a horizontal single pel line that extends over the entire width of a swath.

A pel is a print element. These are the individual dots on a page that are used to create an image.

2. Overview of Invention

In FIG. 1, printer 10 includes an input/output (I/O) port 12, microprocessor 4, an application specific integrated circuit (ASIC) 16, print engine 18, memory 20 such as random access memory (RAM), and read only memory (ROM) 30, all connected by a bus 19. Microprocessor 14 may be a commercially available processor such as a Motorola MC68EC000. The ASIC 16 contains logic circuits that control, for example, the communication interface and provide signals to drive printer motors. The print engine 18 contains all the mechanisms necessary to print on a page including a print head.

Printer 10 receives image description data in the form of a high level language (HLL) from a host processor via I/O 12. The HLL image description data may take one of several forms. It may either be a raster graphics language, such as PCL®, or a page description language, such as PostScript®. The amount of memory in memory 20 available to store the received image description data is substantially less than that required to contain one print line, or swath, of bitmap image data. The size of memory 20 is constrained so as to enable printer 10 to be marketed at the lowest competitive price and also to facilitate imbedding the memory 20, along with the ROM, ASIC and microprocessor, in one chip.

In the preferred embodiment, memory 20 contains an HLL buffer 24, a bitmap buffer 26 and a compressed bitmap buffer 28. The ROM 30 contains a compressor unit 32, a controller unit 34 and a converting unit 36.

Image description data from a host is received via I/O module 12 and read into the HLL buffer 24. Using a raster based language, the host sends data one raster at a time and the required number of rasters for the maximum height of the print head does not have to fit in the HLL buffer 24. As explained further below, if the required number of rasters for the print head does not fit in the HLL buffer 24, the printer stops receiving data from the host either when the HLL buffer 24 is full or a swath has been received. A swath has been received when the number of rasters received equals the total number of vertical nozzles in the print head.

If using a page description language, the page is broken into blocks and the vertical size of the blocks would match the height of the print head. The host must send, and the current invention must receive, enough HLL data to fully describe the row(s) of blocks that make up one swath. A single block is an area of bitmap representation that contains the same number of raster lines as the height of the print head array and contains a number of vertical lines equal to the number of horizontal lines to facilitate manipulation (i.e. a square block).

Printer 10 receives image description data in the form of a high level language (HLL) from the host. The HLL is stored in memory 20 in the HLL buffer 24. Printer 10 continues to receive HLL data while monitoring the usage of the HLL buffer 24. When the data for one swath is received or the HLL buffer 24 is full, printer 10 stops receiving HLL data from the host and the converting unit 36 begins parsing the HLL data and converting it to bitmap data. The converting unit 36 may be any system available that reads in HLL data, parses the HLL data and converts it to bitmap data for the print head to print. Conversion is performed one raster at a time. The bitmap data is stored in the bitmap buffer 26 of memory 20. When all rasters for the current swath have been converted or the bitmap buffer 26 is full, the compressor unit 32 compresses the bitmap data and stores it in the compressed bitmap buffer 28. When the compressed bitmap buffer 28 is full, the controller unit 34 changes the starting and ending addresses of the bitmap buffer 26 and the compressed bitmap buffer 28. This allows the compressor unit 32 to utilize memory in the bitmap buffer 26 that contains bitmap data which has been compressed. In essence, the controller unit 34 allows the compressor unit 32 to overwrite the bitmap buffer 26.

When the compressed bitmap buffer 28 and the bitmap buffer 26 are full with compressed bitmap data, the compressed bitmap data is sent to the print engine 18. The print engine 18 uncompresses the data and sends it to the print head to be printed.

3. Overall Control Flow of Invention

The high level control flow of the present invention, performed by the controller unit 34 resident in the ROM 30 in a preferred embodiment, is described below, both in pseudo-code and in a more detailed format. Reference is made in [brackets] in the pseudo-code to the steps illustrated in FIGS. 2-3.

```
[202]   assign initial buffer boundaries;
[204]   Loop A: while (HLL buffer is not full OR have not received a
        swath/page)
[206]       receive HLL data;
[208]       if (swath or page received)
[214]           adjust HLL buffer size and bitmap buffer size;
[214]           FULL_SWATH = YES;
[209]       else
[210]           if (HLL buffer is full)
[212]               FULL_SWATH = NO;
        } /* end Loop A */
[216]   stop host sending data;
[218]   Loop B: while(bitmap buffer is not full OR not all rasters for
        current swath are converted)
[220]       convert one raster from HLL data to bitmap data;
[222]       if (all rasters for current HLL Buffer are converted)
```

-continued

```
[229]           CURR_HLL_CONV = YES;
[223]       else
[224]           if (bitmap buffer is full)
[228]               CURR_HLL_CONV = NO;
[228]               LAST_RASTER = CURRENT_RASTER;
[225]           else
[226]               CURRENT_RASTER = CURRENT_RASTER + 1;
        } /* end Loop B */
[232]   compress data in bitmap buffer and store it in the compressed
        bitmap buffer;
[234]   if (CURR_HLL_CONV = YES), and
[237]       if (FULL_SWATH = YES), then
                go to 238
[243]       else
[248]           go to Loop A;
[235]       else
[236]   if (uncompressed bitmap buffer region == 0)
[238]       send compressed data to print engine; else 240
[240]   if (CURR_HLL_CONV = NO),
[242]       CURRENT_RASTER = LAST_RASTER + 1
[244]           go to Loop B;
[241]       else
[250]   END
```

In step 202 the memory 20 is allocated into at least three memory regions or buffers. The first region is the High Level Language (HLL) buffer 24. This buffer is used as a holding area for incoming image description data from the host through I/O 12. The image description data is usually in the format of a high level language such as PCL® or PostScript®. The second region is the bitmap buffer 26 and it is used for storing the bitmap data. The third region is the compressed bitmap buffer 28. This buffer is used to hold compressed bitmap data. Each of these buffers, the HLL buffer 24, the bitmap buffer 26 and the compressed bitmap buffer 28 all contain a starting and an ending address which define the size of each buffer. The starting and/or the ending address of each of these buffers, and hence their sizes, may change based on the size of the incoming image data. The starting and ending address of these buffers are initialized to starting values and are modified by the controller unit 34 to improve efficiency and to increase memory utilization. For example, as bitmap data is compressed, it is stored in the compressed bitmap buffer 28. Once the memory allocated to the compressed bitmap buffer 28 is full, the compressed bitmap buffer 28 is expanded by changing the ending address of the bitmap buffer 26 and the starting address of the compressed bitmap buffer 28 so that the memory region pre-allocated to the bitmap buffer 26 is now allocated to the compressed bitmap buffer 28.

The size of the buffers may vary. However, at startup, the maximum size for the HLL buffer 24 and the minimum size for the compressed bitmap buffer 28 must be set to ensure that some memory is allocated to the bitmap buffer 26 and the compressed bitmap buffer 28. The HLL buffer 24 maximum size is set so that the controller unit 34 does not fill the entirety of memory 20 with HLL data.

The minimum size for the compressed bitmap buffer 28 must also be set so that the compressor unit 32 has pre-allocated memory to begin storing the compressed bitmap data. Once the compressor unit 32 has begun compressing the bitmap data, the compressed bitmap data is written into memory at a rate less than the bitmap data being read as input so that, if needed, the compressed bitmap buffer 28 may expand to include the memory region pre-allocated to the bitmap buffer 26.

After the initial memory limits have been set, the present invention begins Loop A at step 204. Loop A continues while the HLL buffer 24 is not full or the present invention has not received a complete swath or page. In Loop A, the current invention receives HLL data in step 206 from the host via I/O 12. The HLL data is contained in packets defined by the communication channel used between the host and the printer 10. For example, the packet size for the IEEE-1284 communications interface is one byte or eight bits of data. After each byte is received, printer 10 checks if a swath or a page has been received in step 208. For a raster graphics language such as PCL®, a swath has been received once printer 10 receives a raster for each print nozzle of the printhead. For a page description language, such as PostScript®, the HLL data from the host contains a termination string that denotes the end of the page.

If a swath or page has been received and the HLL buffer 24 is not full, the ending address of the HLL buffer 24 is decreased and the starting address of the bitmap buffer 26 is increased to include the memory space not used by the HLL buffer 24. This is performed by step 214. If a swath or page was not received and the HLL buffer 24 is full, the FULL_SWATH variable is set to NO in step 212 to indicate that only a partial swath has been received, i.e., not all rasters of the total number of rasters of the swath have been received.

Once Loop A is completed, printer 10 stops the host from sending any more data at step 216 and begins Loop B at step 218. Loop B continues as shown in step 218 while the bitmap buffer 26 is not full or not all rasters for the current swath have been converted.

In Loop B, printer 10 first converts one raster of HLL data to bitmap data in step 220. The bitmap data is stored in bitmap buffer 26. If all rasters or blocks for the current swath are rendered in step 222, the flag CURR_HLL_CONV is set in step 230 to signify that the system has a complete bitmap for the current swath. If not all the rasters have been converted and the bitmap buffer 26 is full, the flag CURR_HLL_CONV is set to NO at step 228 and the variable LAST_RASTER is set to the CURRENT_RASTER in step 228 so that the controller unit 34 can keep up with how many rasters for the current swath have been converted. If the bitmap buffer 26 is not full, the CURRENT_RASTER variable is incremented in step 226 and Loop B is repeated.

Once Loop B (see step 218) is completed, the compressor unit 32 compresses data in the bitmap buffer 26 and stores it in the compressed bitmap buffer 28. The compressor unit 32 may utilize any industry known compression algorithm such as LZW compression, Mode M compression, run length encoding, delta row encoding or tagged image file format (TIFF). The compressor unit 32 first stores the bitmap data in the memory region allocated to the compressed bitmap buffer 28. Once the compressed bitmap buffer 28 is full, the controller unit 34 increases the size of this buffer by overwriting the bitmap buffer 26 with compressed bitmap data. This is accomplished by changing the starting and ending addresses of the bitmap buffer 26 and the compressed bitmap buffer 28. The compressor means keeps storing bitmap data in the expanded compressed bitmap buffer 28 until either all the data in the bitmap buffer 28 is compressed or the size of the bitmap buffer 26 is zero. This is performed in steps 234-250.

In step 234, the flag CURR_HLL_CONV is checked. If this flag is set, the compressed bitmap data in the compressed bitmap buffer 28 is sent to the print engine 18 in step 238 and that partial swath is printed. Also, if the size of the bitmap buffer 26 is zero in step 236, this signifies that there is no more memory to store compressed bitmap data, and the data in the compressed bitmap buffer 28 is sent to the print engine 18 in step 238. If the CURR_HLL_CONV flag is false in step 240, the CURRENT_RASTER variable is set to the LAST_RASTER variable in step 242, and Loop B is repeated in step 244. Step 242 is performed so that when Loop B is repeated, the controller unit 34 is able to keep up with which raster to convert next. If the CURR_HLL_CONV variable is set and if the job is not complete Loop A is repeated, via steps 246, 248. If the job is completed, the current invention stops in step 250.

4. Sample Iterations of Invention

To better understand the control flow of the invention, examples are provided showing how the current invention would handle two print jobs. The image description data for one print job is for the raster control language PCL® and the image description data for the other job is for the page control language PostScript®.

PCL® Example

This example shows the process for a single swath. The sample consists of the word HELLO printed in a 6 point Arial font located at the top left hand corner of the page.

The PCL raster graphics file corresponding to the above sample is structured as follows.

| Header Information | resolution, print direction, compression type, etc. |
|---|---|
| Raster#1 Data | 06, 00, 61, FF, F8, C0, 03, 00, 01, FC, |
| Raster#2 Data | 06, 00, 61, FF, F8, C0, 03, 00, 07, FF, |
| Raster#3 Data | 06, 00, 61, 80, 00, C0, 03, 00, 0F, 07, 80, |
| Raster#4 Data | 06, 00, 61, 80, 00, C0 03, 00, 0C, 01, 80, |
| Raster#5 Data | 06, 00, 61, 80, 00, C0, 03, 00, 18, 00, C0, |
| Raster#6 Data | 06, 00, 61, 80, 00, C0, 03, 00, 18, 00, C0, |
| Raster#7 Data | 06, 00, 61, 80, 00, C0, 03, 00, 30, 00, 60, |
| Raster#8 Data | 06, 00, 61, 80, 00, C0, 03, 00, 30, 00, 60, |
| Raster#9 Data | 07, FF, E1, FF, F0, C0, 03, 00, 30, 00, 60, |
| Raster#10 Data | 07, FF, E1, FF, F0, C0, 03, 00, 30, 00, 60, |
| Raster#11 Data | 06, 00, 61, 80, 00, C0, 03, 00, 30, 00, 60, |
| Raster#12 Data | 06, 00, 61, 80, 00, C0, 03, 00, 30, 00, 60, |
| Raster#13 Data | 06, 00, 61, 80, 00, C0, 03, 00, 18, 00, C0, |
| Raster#14 Data | 06, 00, 61, 80, 00, C0, 03, 00, 18, 00, C0, |
| Raster#15 Data | 06, 00, 61, 80, 00, C0, 03, 00, 0C, 01, 80, |
| Raster#16 Data | 06, 00, 61, 80, 00, C0, 03, 00, 0F, 07, 80, |
| Raster#17 Data | 06, 00, 61, FF, F8, FF, E3, FF, 83, FF, 00, |
| Raster#18 Data | 06, 00, 61, FF, F8, FF, E3, FF, 81, FC, 00 |

Each of the lines of raster data in the table above is preceded with a command string (not shown) that will instruct the interpreting software to construct a new line from data following the command string. The data sent from the host may be compressed using PCL method 9 as described in the Hewlett Packard, HP Deskjet 500 Series, Technical Reference Guide. This compression method uses a combination of delta row and run length encoding. Once uncompressed, the data from the host is as shown on the table above. Note that according to the PCL specification, each of the rasters must be separated by a command such that they can be identified as a new raster line. Printer 10 uses this command string to count how many rasters have been received. The actual data file is structured as <command>,<data>,<command>,<data>, and so forth such that the controller unit 34 can strip off commands and gather data accordingly to recreate the original bitmap image. The actual size of the PCL file is 219 bytes. For purposes of this example, the initial memory allocations are;

HLL buffer—100 bytes

Bitmap buffer—100 bytes

Compressed bitmap buffer—100 bytes

These numbers will help to exemplify some of the features associated with low system memory. It should be noted that these limits are not practical for a real system and are only applicable to this example.

The first 81 bytes of the file contain header information that sets up the printer speed, resolution, print direction, compression type, etc. Printer 10 interprets these command strings as they are received and therefore does not need to store these 81 bytes in the memory 20. The entire header is considered an HLL data packet at step 206 and, once received, control passes through steps 208 and 210 back to step 206 to begin receiving another HLL data packet.

The command string for the first raster data transfer starts on the 82nd byte received. This can be considered the start of another data packet. Printer 10 interprets the command and reads in from the host the appropriate number of bytes of data. As mentioned previously, this data may be compressed and will therefore need to be uncompressed later to get a bitmap representation. The first command and data contains 17 bytes to be stored in the HLL buffer 24. The next command string is read to test decision step 208. If the end transfer command is received, step 208 evaluates true and the control passes to step 214. In this case, step 208 and step 210 are false and the next packet is received. With the HLL region set to 100 bytes, step 208 will continue to be false and step 210 will be true after the 16th raster has been received. Control passes to step 212 and through to step 216 where the host transmission is stopped.

The uncompressed bitmap image creation begins at step 220 with the creation of the rasters from the compressed data packets. In this case, each of the first two raster lines are 10 bytes long and the remaining sixteen raster lines are each 11 bytes long. The allocated region of 100 bytes for the uncompressed bitmap will overflow when the system attempts to create the 10th raster line. The first nine will consume 97 bytes (2*10+7*11). Thus after the creation of the 10th raster line, the decision at step 224 will evaluate true and control passes through step 228 to step 232. The value of CURRENT_RASTER is now 10.

A compression ratio of 4 to 1 will be used to quantify the compressor unit 32 at step 232. Thus, the compressed bitmap buffer 28 after step 232 will contain 25 bytes. Step 234 evaluates to false because the bitmap is not complete and step 236 evaluates to false. The process moves to step 242, and step 242 resets the raster pointer to the value of CURRENT_RASTER and Loop B at step 218 is repeated.

The loop consisting of steps 220, 222, 224, and 226 will repeat for rasters 10 through 16. Thereafter, the system will exit through step 222 via steps 229 and 230 to step 232 to compress these additional raster lines. Since the first nine rasters have been compressed, these new raster lines 10–16 are written in the bitmap buffer over the previous nine rasters. The decision at step 236 is still false, but step 240 is now true and the decision at step 246 is evaluated to see if the job is finished. In this case step 246 is false and control moves back to Loop A at step 204 to receive the final two rasters from the host.

The last two rasters are easily accommodated in the buffers and, after receipt of the termination, command step 208 evaluates true and step 214 will reduce the HLL allocation to hold only the last two raster lines (26 bytes) and increase the bitmap buffer 26 by the same amount. Step 214 will also set the variable FULL_SWATH to YES such that step 237 will send the job to the print engine 18 to be printed. After processing the final two rasters the compressed bitmap buffer 28 will contain approximately 30 bytes. When the decision at step 237 is reached, the variable FULL_SWATH=YES and the job is released to the print engine 18 at step 238.

PostScript® Example

A PostScript® representation of the same print file used in the PCL example is used to demonstrate the use of the invention in the case of a page description language. The PostScript® output contains a dictionary definition section that sets up a list of predefined commands to be used throughout the print job. This dictionary output is different for each unique PostScript® driver. The entire print file is 12,063 bytes. The dictionary built for this example is approximately 11,000 bytes. The body of the file is less than 500 bytes. The file also contains trailer information to finish the job.

The buffer size for this example is set as follows:

HLL buffer—20K bytes

Bitmap buffer—200 bytes

Compressed bitmap buffer—100 bytes

The HLL buffer is larger for the page description language because the printer must store the contents of the custom dictionary for the duration of the print job. The commands stored in the dictionary will be referenced in the body of the print file and will be used repeatedly by the language interpreting software to build the print image. The header and some of the dictionary definitions from the actual postscript output file is included below.

_%-12345X@PJL JOB
@PJL SET RESOLUTION=300
@PJL RDYMSG DISPLAY="Word Pro-Untitled1"
@PJL ENTER LANGUAGE=Postscript
_M%!PS-Adobe-3.0
%%Creator: LEXPS Version 4.12
%%Title: Word Pro-Untitled1
%%LanguageLevel: 2
%%BoundingBox: 18 17 597 776
%%DocumentNeeded Resources: (atend)
%%DocumentSuppliedResources: (atend)
%%Pages: (atend)
%%Begin Resource: procset Win35Dict
/Win35Dict 290 dict def Win35Dict begin/D/def load def/
 bd{bind D}bind D/in{72 mul}bd/ed{exch D}bd/ld{load
 D}bd/tr/translate ld/scl{in 100 div}bd/rlt/rlineto ld/spg/
 showpage ld/NupSpg/showpage ld/gs/gsave ld /gr/
 grestore ld/M/moveto ld/L/lineto ld/rmt/rmt/moveto
 ld/rct/rcurveto ld/st/stroke ld/n/newpath ld/sm/setmatrix
 ld/cm/currentmatrix ld/cp /closepath ld/ARC/arcn
 ld/TR{65536 div}bd/lj/setlinejoin ld/lc/setlinecap The entry /Win35Dict is the beginning of the dictionary definition for this print job. Once the dictionary has been stored in memory the interpreting software can start processing the main body of the file. The body and the trailer of the output file for this example are shown below.

| Line | PostScript ® |
| --- | --- |
| 1 | %%BeginFeature: *Resolution 300dpi |
| 2 | 1 dict dup /HWResolution [300 300] put setpagedevice |
| 3 | %%EndFeature |
| 4 | } stopped cleartomark |
| 5 | %%EndSetup |
| 6 | %%Page: 1 1 |
| 7 | %%PageResources: (atend) |
| 8 | SS |
| 9 | 0 0 25 22 804 1100 300 SM |
| 10 | 32 0 0 25 25 0 0 0 23 /Helvetica /font8 ANSIFont font |
| 11 | 0 0 0 fC |
| 12 | gs 182 28 199 234 CB |
| 13 | 225 234 82 (HELLO) 82 SB |
| 14 | gr |
| 15 | |
| 16 | 1 #C |
| 17 | EJ RS |
| 18 | %%PageTrailer |
| 19 | %%PageResources: font Helvetica |
| 20 | %%Trailer |
| 21 | SVDoc restore |

-continued

| Line | PostScript ® |
|------|--------------|
| 22 | userdict /SVDoc known {SVDoc restore} if |
| 23 | end |
| 24 | %%Pages: 1 |
| 25 | % TrueType font name key: |
| 26 | % MSTT31c3cf = 3d56DArialF00000000000001900000 |
| 27 | % MSTT31c3da = 3d56DTimes New RomanF00000000000001900000 |
| 28 | %%DocumentSuppliedResources: procset Win35Dict 3 1 |
| 29 | |
| 30 | %%DocumentNeededResources: font Helvetica |
| 31 | |
| 32 | %%EOF |
| 33 | _%-12345X@PJL RDYMSG DISPLAY="" |
| 34 | _%-12345X@PJL EOJ |
| 35 | _%-12345X |

The interpreting software in the printer will read the command at line 8 above and, referring to the dictionary, begin setting up the page description. Lines 8 and 9 are command structures that define the parameters of the page (i.e. size, margins, ect.) Line 10 calls the desired font from the PostScript® font dictionary. Lines 11 and 12 are page format commands. Line 13 is the command that places the word "HELLO" on the page. Line 17 causes the page to be printed with the EJ command. The EJ dictionary entry contains the postscript command showpage that indicates the end of the job and sends the image to the print engine. The page trailer that follows contains a document summary.

Figure 2:
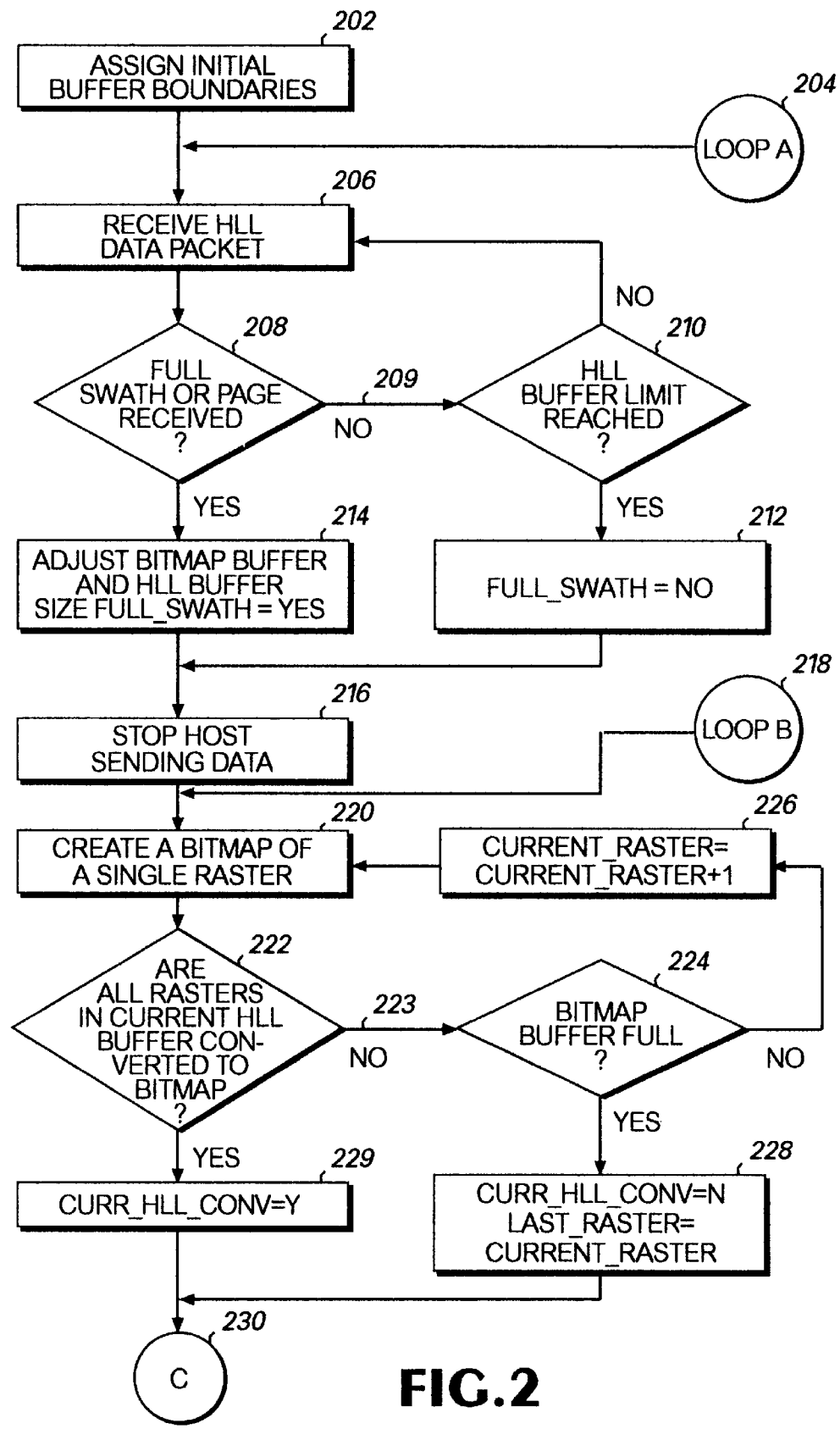
FIG. 2 is a flowchart depicting the overall operation of the present invention.
Figure 3:
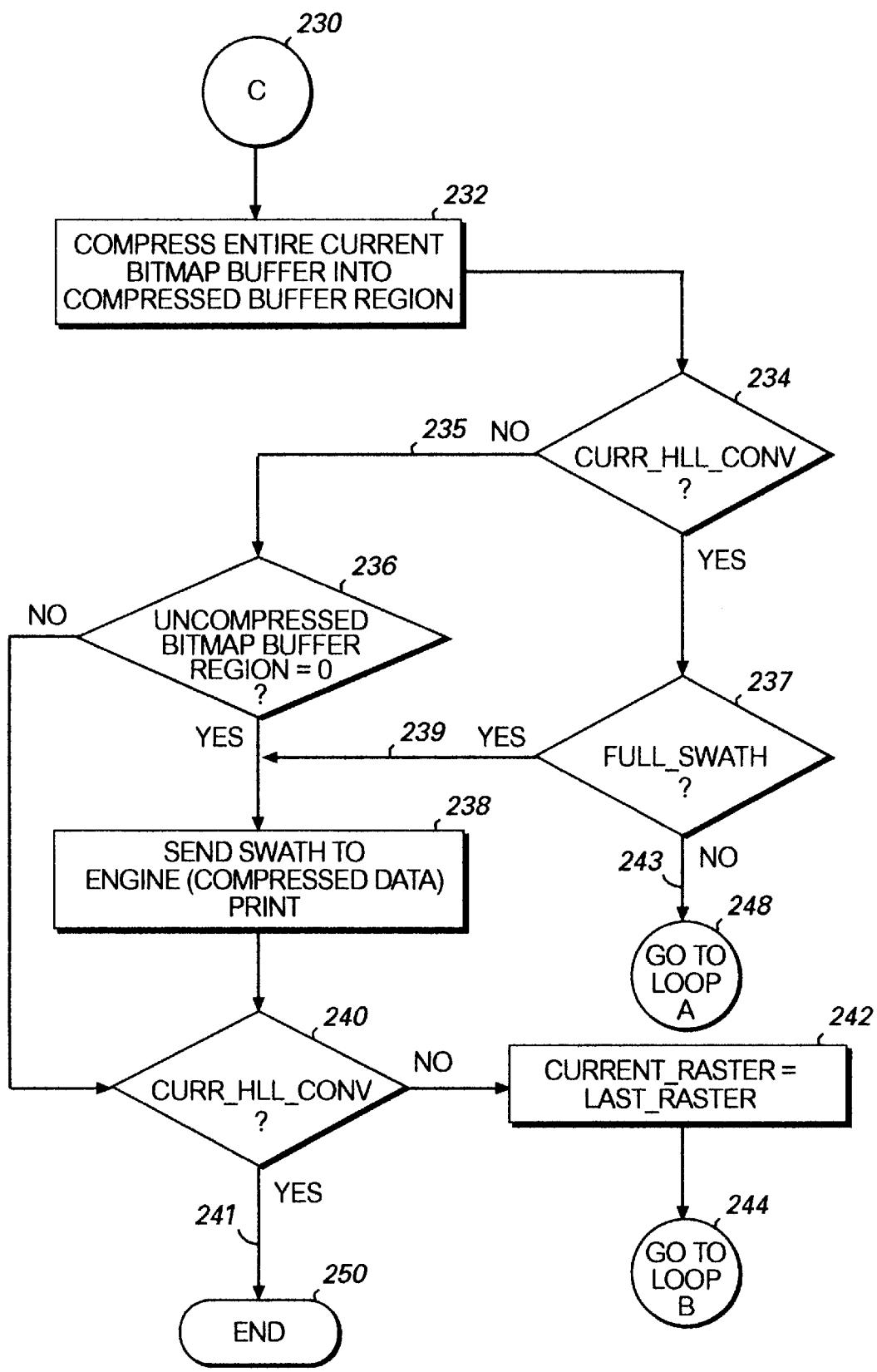
FIG. 3 is a continuation of the flowchart of FIG. 2 depicting the overall operation of the present invention.

Referring to FIGS. 2 and 3, the HLL data packet for this example will be a single byte. The communication interface is IEEE-1284 and is by specification a single byte per transfer. Loop A will receive the complete postscript data file and the HLL buffer will not be full. Thus, the decision 210 will never exit as a YES and the loop will be exited when the end-of-file is reached in decision 208. In 214, the HLL buffer will be reduced to release the remainder of the 20K bytes that are not needed to hold the postscript data. The variable FULL_SWATH is set to YES and 216 stops the host transmission. Step 220 is the beginning of the interpreting software that builds the bitmap from the HLL data. In this example, the bitmap data is retrieved from a font library that is stored in a separate system memory and accessed as necessary to build characters used from specific font sets. Such a font library must remain resident in the printer memory and is considered to be a portion of the high-level language interpreting software. Line 10 of the postscript file references a font named Helvetica. This name is used by the interpreting software to locate a set of bitmap representations of the characters that belong to the described font. These bitmaps are placed in proximity to each other and scaled appropriately to form the word HELLO as it is seen on the printed image.

Loop B, in this instance, will finish with a swath buffer that contains essentially the same data as was previously shown for the PCL example. Some small differences based on the exact construction of the characters may occur. The uncompressed swath bitmap will be constructed as in the PCL example and the flow through the rest of the algorithm will be similar. The uncompressed swath buffer for this example is 200 bytes and will be able to hold the entire swath bitmap. If the decision 222 evaluates YES, 230 will set the variable CURR_HLL_CONV to YES and the program flow will go to loop C. The compressor 232 will compress the swath bitmap and store the compressed version in the compressed swath buffer. Loop C will complete when the swath compression is finished and 238 will send the compressed swath to the print engine to be printed. The decision 240 will evaluate as YES and likewise for 246. The page will be finished and the program flow will end at 250.

While the invention has been described in detail with specific reference to preferred embodiments thereof, it is understood that variations and modifications thereof may be made without departing from the spirit and scope of the invention.

What is claimed is:

1. A printing apparatus comprising:
    a) first memory means having a starting address and an ending address for receiving and storing image description data representing one swath of data to be printed;
    b) second memory means having a starting address and an ending address for storing bitmap data;
    c) third memory means having a starting address and an ending address for storing compressed bitmap data;
    d) means for converting image description data to bitmap data by processing at least some of the image description data stored in the first memory means and storing the bitmap data in the second memory means;
    e) means for compressing the bitmap data stored in the second memory means;
    f) means for printing the compressed bitmap data stored in the third memory means; and
    g) means for controlling the printing apparatus comprising:
        i) sensing when the end of a swath of image description data is stored in the first memory means or the first memory means is full;
        ii) causing the converting means to convert image description data from the first memory means to bitmap data;
        iii) storing the bitmap data in the second memory means;
        iv) causing the means for compressing to compress the bitmap data in the second memory means;
        v) storing the compressed bitmap data in the third memory means;
        vi) sensing when the third memory means is full;
        vii) causing the printing means to print the compressed bitmap data once the third memory means is sensed as being full in step vi.

2. The printing apparatus of claim 1, wherein the first memory means, the second memory means and the third memory means are contiguous.

3. The printing apparatus of claim 1, wherein the means for controlling further includes means for changing the ending address of the first memory means, the beginning address and the ending address of the second memory means, and the beginning address of the third memory means thereby increasing and/or decreasing the size of each of the respective memory means while retaining the cumulative memory size of the first memory means, the second memory means and the third memory means.

4. The printing apparatus of claim 1, wherein the first memory means, the second memory means and the third memory means comprise random access memory.

5. A printing method comprising the steps of:
    a) inputting and storing in a first memory, having a starting address and an ending address, image description data representing one swath of image data to be printed;
    b) converting a partial swath of said image description data to bitmap data;
    c) storing said bitmap data in a second memory having a starting address and an ending address;

d) compressing the bitmap data stored in the second memory and storing the compressed bitmap data in a third memory, wherein the third memory has a starting address and an ending address; and e) sending to a printing device the compressed bitmap data stored in the third memory, once the third memory is full.

6. The method of claim 5 further including the step of changing the ending address of the first memory, the beginning address and the ending address of the second memory, and the beginning address of the third memory, thereby increasing and/or decreasing the size of each of the first memory, second memory, and third memory while maintaining constant the total size of the first memory, second memory, and third memory.

* * * * *